United States Patent
Kawabe et al.

[11] Patent Number: 5,868,410
[45] Date of Patent: Feb. 9, 1999

[54] FRONT SUSPENSION DEVICE

[75] Inventors: Yoshihiro Kawabe, Kamakura; Takuya Murakami, Fujisawa; Kenji Kawagoe, Yokosuka; Takao Kuno, Ebina, all of Japan

[73] Assignee: Nissan Motor Co., Ltd., Yokohama, Japan

[21] Appl. No.: 716,064

[22] Filed: Sep. 19, 1996

[30]     Foreign Application Priority Data

Sep. 22, 1995  [JP]  Japan ................................... 7-244143

[51] Int. Cl.$^6$ ...................................................... B60G 3/20
[52] U.S. Cl. .............................. 280/124.15; 280/124.134; 280/124.138
[58] Field of Search ..................... 280/668, 673, 280/675, 691, 696, 692, 725, 726, 124.125, 124.134, 124.135, 124.138, 124.145, 124.15

[56]           References Cited

U.S. PATENT DOCUMENTS

| 4,753,455 | 6/1988 | Murakami et al. | 280/675 |
| 4,883,287 | 11/1989 | Murakami et al. | 280/696 |
| 4,934,729 | 6/1990 | Murata et al. | 280/675 |
| 5,348,337 | 9/1994 | Ando | 280/673 |

FOREIGN PATENT DOCUMENTS

| 0 548 989 A1 | 12/1992 | European Pat. Off. . |
| 5-178041 | 7/1993 | Japan . |

*Primary Examiner*—Stephen M. Johnson
*Attorney, Agent, or Firm*—Foley & Lardner

[57]           ABSTRACT

A front wheel suspension for motor vehicles is constructed such that an upper link is so connected at one single end thereof to a connecting member as to provide an arrangement wherein loading a wheel support member in the lateral direction with respect to the normal forward driving direction of the motor vehicle induces a reaction force along a link axis of the upper link without inducing any substantial amount of moment about a king pin axis.

5 Claims, 5 Drawing Sheets

FRONT SUSPENSION DEVICE

BACKGROUND OF THE INVENTION

The present invention relates to wheel suspensions for front wheels of motor vehicles.

A conventional front wheel suspension for motor vehicles is disclosed, for example, in JP-A 5-178041. This front wheel suspension comprises a support member rotatably supporting to a front wheel and having an upper portion and a lower portion, a lower link swingably supported by a vehicle body and pivotally supporting the support member at the lower portion thereof, a connecting member mounted to the upper portion of the support member for rotation about an axis thereof, a shock absorber operatively connected between the vehicle body and the connecting member, an upper link swingably supported by the vehicle body and connected to the connecting member, and a tie rod operatively connected to the support member to rotate the support member about a king pin axis aligned with the axis of rotation of the connecting member. The upper link has an end having two branches and pivotally mounted to the connecting member at two point thereof. Due to such construction, the front wheel suspension presents not only a merit of the strut type, but that of the double wishbone type.

As for the above conventional front wheel suspension, however, the upper link and the connecting member are connected to each other at two points to enable relative rotation about a connecting shaft extending in the longitudinal direction of the motor vehicle, so that, when mounting the upper link to the connecting member, two resilient bushes or joints which are rotatable only about their respective axes such as a ball joint are needed, resulting in a unsolved problem of increased weight and cost. Moreover, due to a need to dispose two joints in the longitudinal direction of the motor vehicle, or dispose to the shaft extending in the longitudinal direction of the motor vehicle a joint which is generally axially long, and rotatable only thereabout, the front wheel suspension has large longitudinal length, resulting in a unsolved problem of less degree of freedom of layout in view of interference with a tire/wheel upon turning thereof.

Such unsolved problems can be solved by connecting the upper link and the connecting member at one point. As for such simple one-point connection of the upper link and the connecting merrier, however, when the tire undergoes a lateral force upon turning of the motor vehicle, etc., the connecting member is rotated about the connecting shaft with a wheel support member, making very difficult a balance of the camber rigidity and the lateral rigidity, resulting in a possible occurrence of a mounting problem.

It is, therefore, an object of the present invention to provide wheel suspensions for front wheels of motor vehicles which ensure appropriate maintaining of a balance of the camber rigidity and the lateral rigidity.

SUMMARY OF THE INVENTION

One feature of the present invention lies in providing a wheel suspension for a front wheel of a motor vehicle including a vehicle body, comprising:

a support member rotatably supporting the front wheel, said support member having an upper portion and a lower portion;

a lower link swingably supported by the vehicle body and pivotally supporting said support member at said lower portion thereof;

a connecting member mounted to said upper portion of said support member for rotation about an axis thereof;

a shock absorber operatively connected between the vehicle body and said connecting member;

an upper link swingably supported by the vehicle body and connected to said connecting member; and a tie rod operatively connected to said support member to rotate said support member about a king pin axis aligned with said axis of rotation of said connecting member, said upper link being so connected at one single end thereof to said connecting member as to provide an arrangement wherein loading said support member in a lateral direction with respect to a normal forward driving direction of the motor vehicle induces a reaction force along a link axis of said upper link without inducing any substantial amount of moment about said king pin axis, whereby improved degree of freedom of layout and appropriate maintaining of a balance of the camper rigidity and the lateral rigidity can be obtained.

Another feature of the present invention lies in the fact that said link axis crosses said king pin axis as viewed in an end view of the wheel suspension with respect to the normal forward driving direction, and preferably, said link axis and said king pin axis have an intersection point, whereby further improved degree of freedom of layout and appropriate maintaining of a balance of the camper rigidity and the lateral rigidity can be obtained.

Still another feature of the present invention lies in the fact that said resilient bush is disposed between said upper link and said connecting member, whereby, if the intersection point of the link axis of the upper link and the rotation axis of the rotary connecting member is displaced due to manufacturing tolerance, etc., the torsion rigidity of the resilient bush serves to receive a moment in accordance with a distance between the two axes, enabling appropriate maintaining of a balance of the camber rigidity and the lateral rigidity.

Still another feature of the present invention lies in the fact that said resilient bush has an axis perpendicular to said link axis of said upper link, whereby the amount of displacement of the resilient bush can be reduced when an axial force operates on the upper link, enabling more appropriate maintaining of a balance of the camber rigidity and the lateral rigidity.

The other feature of the present invention lies in the fact that said king pin axis passes through said intersection point, whereby the rotation axis of the rotary connecting member can be aligned with the king pin axis, so that, upon turning of the front wheel, the wheel support member rotates about the mounting shaft of the connecting member and the mounting point of the lower link to produce a displacement of the lower link, upper link, and strut, preventing occurrence of needless input and displacement of the resilient bush, etc.

A further feature of the present invention lies in the fact that said upper link is connected to said connecting member at a location disposed outwardly of said intersection point with respect to the vehicle body as viewed in the end view of the wheel suspension, whereby the length of the upper link can be increased in avoiding interference with the front wheel, brake rotor, etc., resulting in improved durability of the resilient bush and linear camber change.

A still further feature of the present invention lies in the fact that said lower link comprises two link parts, each part having one end connected to said support member at said lower portion thereof, whereby, considering a king pin axis upon turning of the wheel as a virtual king pin axis, the king pin can be set in the most suitable position in spite of interference with the other parts such as a brake rotor.

DETAILED DESCRIPTION OF THE INVENTION

Figure 1:
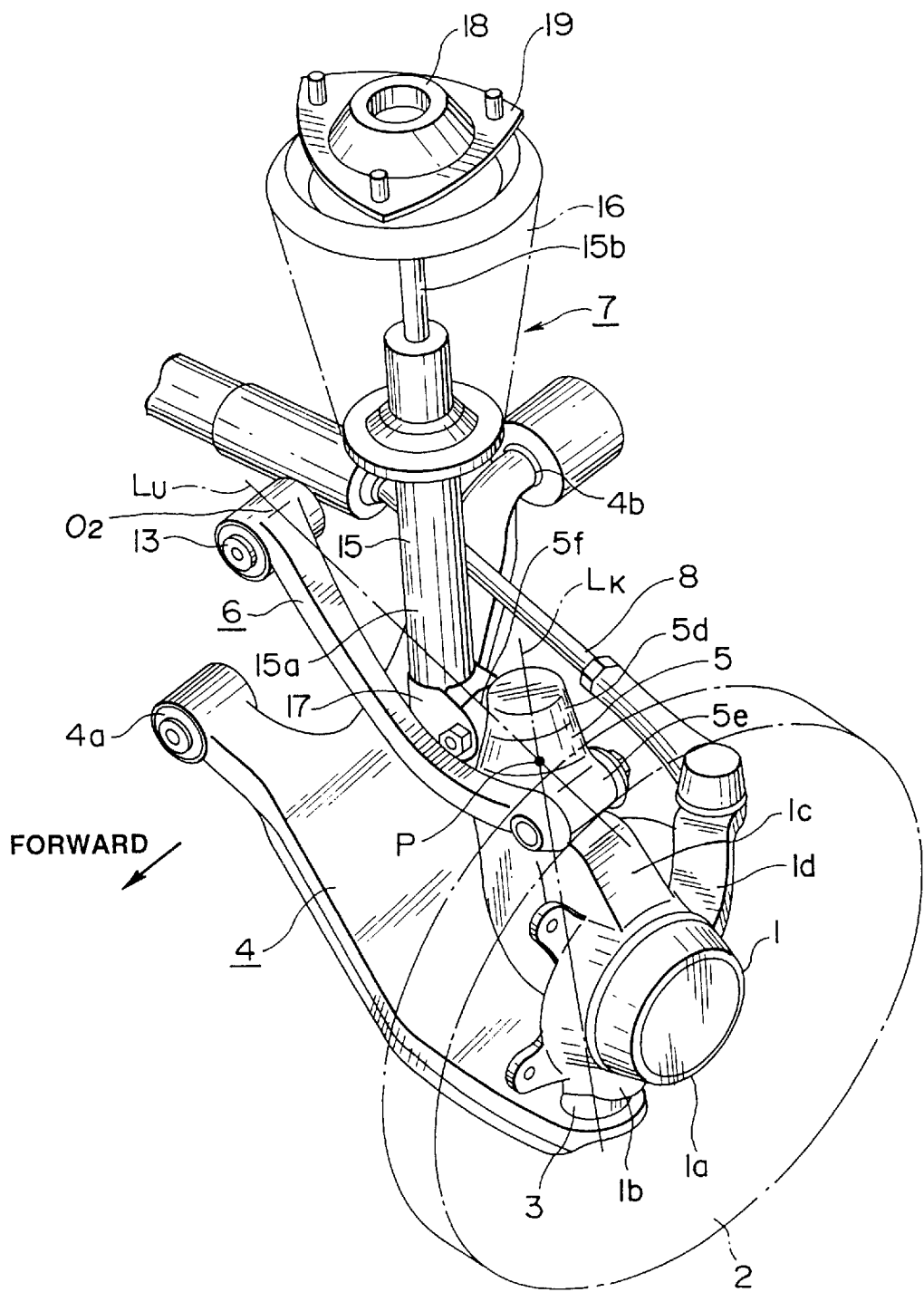
FIG. 1 is a perspective view showing a first preferred embodiment of a front wheel suspension for motor vehicles according to the present invention.

Referring to the drawings wherein like reference numerals designate like parts throughout the views, a description will be made with regard to preferred embodiments of wheel suspensions for front wheels of motor vehicles.

Figure 2:
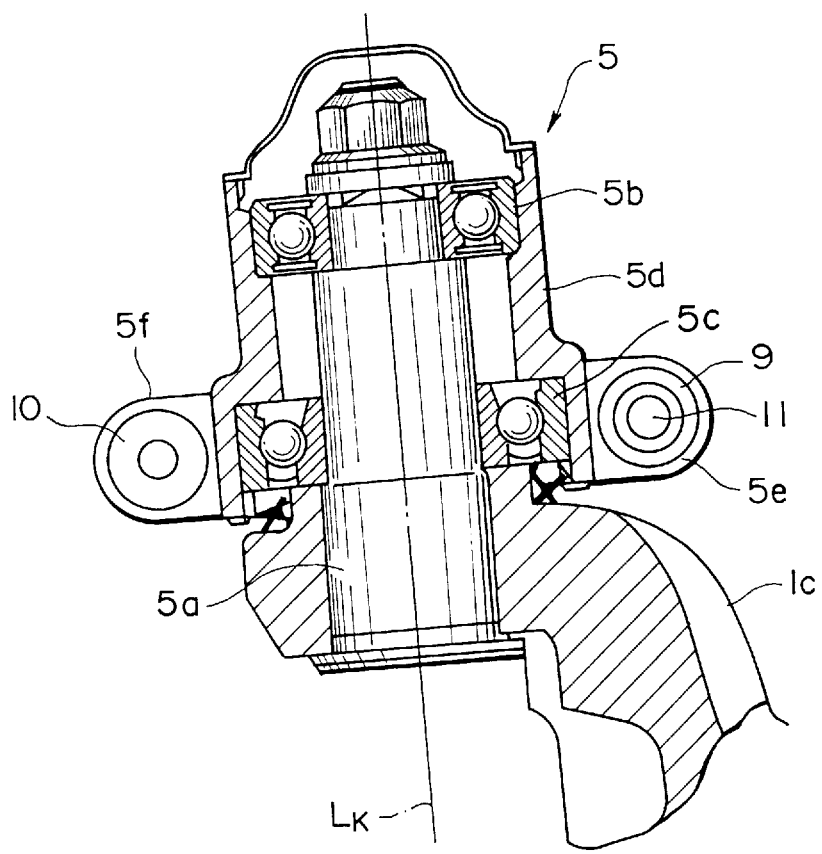
FIG. 2 is a sectional view showing a rotary connecting member of the front wheel suspension in FIG. 1.
Figure 3:
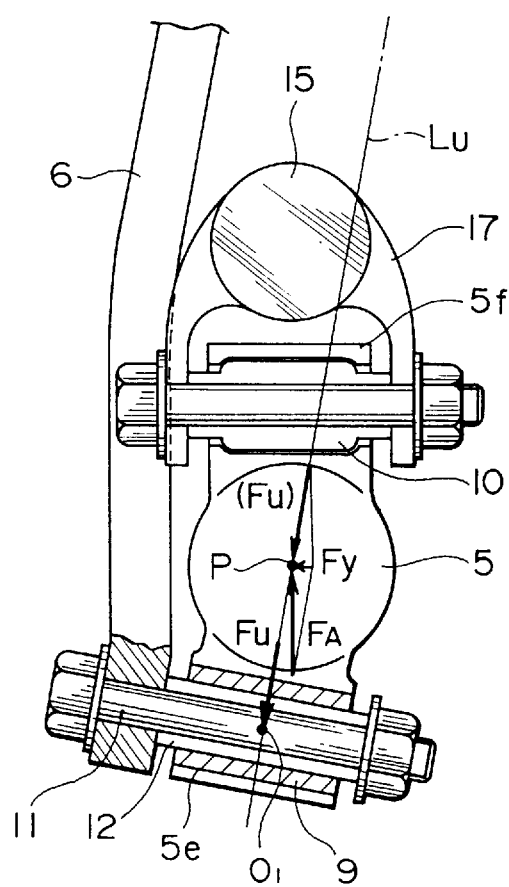
FIG. 3 is a plan view showing the rotary connecting member connected to an upper link.

FIGS. 1–3 shows a first embodiment of the present invention. Referring first to FIG. 1, a wheel support member 1 is arranged to rotatably support a front wheel 2, and has a center portion 1a formed with a cylinder to support a shaft of the front wheel 2, a lower portion 1b to which a lower link 4 is connected through a ball joint 3, an upper portion 1c to which an upper link 6 and a strut 7 are connected through a rotary connecting member 5, and a support portion 1d arranged to protrude backward from the center portion 1a, to which a tie rod 8 is connected.

The lower link 4 is swingably supported by a vehicle body, not shown, to pivotally support the support member 1 at the lower portion 1b thereof. Specifically, the lower link 4 is arranged to extend in the lateral direction of a motor vehicle, and has an outer end connected to the lower portion 1b of the wheel support member 1 through the ball joint 3 and an inner end divided into two branches which are connected to a vehicle body side member such as a suspension member or the like, not shown, through resilient bushes 4a, 4b, having an A-shape as viewed in a plan view. Therefore, the lower link 4 allows an vertical movement or bound/rebound of the wheel support member 1, but restrains a longitudinal movement thereof.

Referring to FIG. 2, the rotary connecting member 5 comprises a cylinder 5d rotatably supported through bearings 5b, 5c to a stepped support shaft 5a arranged to the upper portion 1c of the wheel support member 1 so as to have an axis aligned with a king pin axis $L_K$ through a center of the ball joint 3. Referring to FIG. 3, formed to the cylinder 5d on the outer side thereof as viewed in an end view of a front wheel suspension is a cylindrical support portion 5e which extends substantially horizontally, i.e. perpendicularly with respect to a link axis $L_U$ of the upper link 6 as will be described later to support the upper link 6, whereas formed thereto on the inner side as viewed in the end view of the front wheel suspension is a cylindrical support portion 5f which extends substantially longitudinally to support a shock absorber 15. A resilient bush 9 is arranged in the cylindrical support portion 5e, whereas a rotary support shaft 10 is arranged through the cylindrical support portion 5f so that only its rotation is allowed.

Referring to FIG. 3, the upper link 6, which comprises a single I-shaped link, has an outer end as viewed in the end view of the front wheel suspension, to which mounted is a rotary shaft 11 arranged through the resilient bush 9 of the rotary connecting member 5, and an inner end as viewed in the end view of the front wheel suspension, to which mounted is a resilient bush 13 supported to a vehicle body side member, not shown. A cylindrical collar 12 inserted in the resilient bush 9 is arranged around the rotary shaft 11.

The upper link 6 is disposed to extend by and forward of the rotary connecting member 5, and obliquely with respect to the cross direction of the motor vehicle so that the outer end is positioned in front of the inner end. Moreover, referring also to FIG. 1, the upper link 6 is disposed so that the link axis $L_U$, which interconnects centers of axes of the resilient bushes 9, 13, i.e. immobile centers $O_1, O_2$ of motion or pivotal rotation of the resilient bushes 9, 13 when subjected to various torques, crosses the king pin axis or rotation axis $L_K$ of the rotary connecting member 5 at a point as viewed in the end view of the front wheel suspension with respect to the normal forward driving direction. Preferably, the link axis $L_U$ and the king pin axis $L_K$ have an intersection point P. The upper link 6 has a connection on the side of the rotary connecting member 5, which is arranged inside the front wheel 2 as shown in FIG. 1.

Referring to FIG. 1, the strut 7 comprises the shock absorber 15 and a spring 16 arranged therearound. Referring also to FIG. 3, mounted to a lower end of a cylinder tube 15a of the shock absorber 15 is a substantially A-shaped support bracket 17 which is fixed to the rotary support shaft 10 of the rotary connecting member 5 so as to be rotatable only about substantially a longitudinal axis of the motor vehicle. An upper end of a piston rod 15b which protrudes upward from the cylinder tube 15a is mounted to a vehicle body side member, not shown, through a mount rubber 18 and a mounting plate 19.

The tie rod 8 is also connected to a steering device, not shown.

Next, the operation of the first embodiment will be described. The above front wheel suspension, which has a construction of the double wishbone type due to the lower and upper links 4, 6 when viewed from the longitudinal direction of the motor vehicle, and a construction of the strut type when viewed from the cross direction of the motor vehicle, presents merits of the two types with reduced faults thereof.

Specifically, a movement of the front wheel 2 and the wheel support member 1 in accordance with a wheel stroke is restricted by the lower and upper links 4, 6 when viewed from the front thereof, which is the same as that of the double wishbone type, whereas it is restricted by the lower link 4 and the shock absorber 15 when viewed from the side thereof, which is the same as that of the strut type.

Likewise, as for a force input to the front wheel 2, a longitudinal input force is received by the lower link 4 and the strut 7 in the same way as the strut type, whereas a lateral input force is received by the lower and upper links 4, 6 in the same way as the double wishbone type.

Thus, when the front wheel 2 undergoes a lateral force operating from a road surface to the inside of the vehicle body upon turn of the motor vehicle, etc., the wheel support member 1 also receives the lateral force. At that time, in the wheel support member 1 at the lower portion thereof, its movement in the cross direction of the motor vehicle is restricted by the lower link 4, so that the lateral force transmitted to the wheel support member 1 is in turn transmitted to the rotary connecting member 5 arranged in the upper portion of the wheel support member 1, producing a lateral force $F_A$ which operates along the king pin axis $L_K$ as shown in FIG. 3. Due to its rotary support shaft 10 extending substantially longitudinally, the strut 7 hardly produces a reaction force against the lateral force $F_A$.

On the other hand, in the upper link 6, a great reaction force $F_O$ is induced against the lateral force $F_A$ along the link axis $L_O$. It is noted here that the upper link 6 is in the form of an I-shaped Link mounted to a vehicle body side member and the rotary connecting member 5 at one point thereof, respectively, and the link axis $L_U$ intersects the king pin axis $L_K$ at the intersection point P. Therefore, in addition to a small force due to torsion, etc. of the resilient bushes 9, 13, only an axial force of compression or traction is applied along the link axis $L_U$, producing substantially no angular moment for rotating the rotary connecting member 5 about the king pin axis $L_K$. And, only a longitudinal force $F_Y$ produced due to inclination of the link axis $L_u$ with respect to the cross direction of the motor vehicle operates on the rotary connecting member 5. In the same way as a longitudinal input force operating to the front wheel 2, the longitudinal force $F_Y$ is received by the strut 7 supported to the rotary connecting member 5 to be rotatable about the longitudinal axis of the motor vehicle. As a result, even if the upper link 6 and the rotary connecting member 5 are connected to each other at one point, any lowering of the camber rigidity and the lateral rigidity is not produced.

Conventionally, a moment for rotating the rotary connecting member is produced by an axial force of the upper link and a force input from the mounting portion of the wheel support member to the rotary connecting member. For supporting this angular moment, a connection of the upper link and the rotary connecting member is needed to be rotatable only about the longitudinal axis of the motor vehicle, and be ensured by two points.

On the other hand, when the front wheel 2 has a force input from the road surface, and in the normal condition that the rotary support shaft 10 connecting the strut 7 and the rotary connecting member 5 extends substantially longitudinally, a longitudinal input force operates on the rotary connecting member 5 out of the support shaft 5a for the wheel support member 1 and the rotary connecting member 5, which can be canceled by reaction forces at the rotary support shaft 10 for the strut 7 and the rotary connecting member 5 and at a vehicle body mounting point of an upper portion of the strut 7, enabling sure prevention of a longitudinal displacement of the wheel support member 1. If the rotary support shaft 10 for the strut 7 and the rotary connecting member 5 rotates about the king pin axis $L_K$, the rotary connecting member 5 and the strut 7 will rotate about their respective rotation axes, i.e. the king pin axis $L_K$ and an axis of the strut 7, which requires a change of the length of the upper link 6. Actually, however, such a rotational displacement of the rotary connecting member 5 and the strut 7 is not produced due to a reaction force at the upper link 6.

Since the upper link 6 has the outer end as viewed in the cross direction of the motor vehicle, which is connected to the cylindrical support portion 5e on the outer side as viewed in the end view of the front wheel suspension, the length of the upper link 6 can be determined to a large value, resulting in improved durability of the bush and linear camber change.

Moreover, since the cylindrical support portion 5e for mounting the upper link 6 to the rotary connecting member 5 is perpendicularly disposed with respect to the link axis $L_U$, the amount of displacement of the resilient member 9 can be reduced when an axial force operates on the upper link 6, enabling more appropriate maintaining of a balance of the camber rigidity and the lateral rigidity.

When a bound/rebound force is input to the wheel 2 so that a vertical input force operates on the wheel support member 1, a reaction force out of the strut 7 is available to maintaining of a force balance. At that time, as for a torque produced due to offset of the king pin axis $L_K$ with respect to the strut 7, a force balance is maintained due to the fact that the rotary connecting member 5 and the wheel support member 1 are connected to each other about the substantially vertical support shaft 5a. On the other hand, as for a small torque for rotating the rotary connecting member 5 about the king pin axis $L_K$, a force balance is maintained by the reaction force at the upper link 6 as described above.

As for a force obliquely input to the wheel support member 1, consideration given to its longitudinal and lateral components reveals that the above operation prevents an occurrence of a problem such as a needless displacement of the part.

Moreover, as for a case of turning the front wheel 2, when the tie rod 8 is rotated by the steering device, the axis of the support shaft 5a of the rotary connecting member 5 corresponds to the king pin axis $L_K$, so that the cylinder 5d of the rotary connecting member 5 is not rotated at all, resulting in no input of a force due to turning of the front wheel 2 to the upper link 6.

In such a way, according to the first embodiment, the upper link 6 is connected to the vehicle body side member and the wheel support member 1 at one point thereof, respectively, to enable sure prevention of an occurrence of a lowering of the camber rigidity and the lateral rigidity. Therefore, the degree of freedom of layout is increased, particularly, in view of interference of a tire/wheel with its mounting portion upon turning of the front wheel 2 together with a possible reduction in the weight and cost. Moreover, a simple determination of a spring constant of the spring 16 of the strut 7, an elastic coefficient of the resilient bushes 6, 9, and the length of the lower and upper links 4, 6 if necessary allows a construction of the suspension devices for different types of motor vehicle, resulting in common use of the main parts thereof.

Further, due to the upper link 6 disposed before the rotary connecting member 5, a space can be secured behind the rotary connecting member 5. Therefore, when the mounting plate 19 of the strut 7 with respect to the vehicle body side member serves as a plate for reinforcing the strength of corners of a hood ridge for defining an engine room, not shown, and a dashboard, not shown, for example, the mounting position of the mounting or reinforcing plate 19 is more backward than that as shown in FIG. 1, which can meet the potential requirements for backward inclining the strut 7 on the mounting bracket 17 as viewed in FIG. 1, resulting in a possible increase in the degree of freedom of layout.

Still further, the resilient bush 9 is arranged to a mounting portion of the upper link 6 and the rotary connecting member 5, so that, if the intersection point P of the link axis $L_U$ of the upper link 6 and the king pin axis or rotation axis $L_K$ of the rotary connecting member 5 is slightly displaced due to manufacturing tolerance, etc., the torsion rigidity of the resilient member 9 serves to receive a moment in accordance with a distance between the two axes, enabling appropriate maintaining of a balance of the camber rigidity and the lateral rigidity.

Furthermore, the strut 7 is mounted to the rotary connecting member 5, so that the lever ratio can be determined to a value close to 1, whereas the set load of the spring 16 of the strut 7 can be determined to a minimum value necessary to restrain a vertical movement of the front wheel 2, enabling a reduction in a spring constant of the spring 16, a damping force of the shock absorber 15, and the rigidity of the mount rubber 18, resulting in a possible improvement of riding comfort and noise/vibration performance.

Figure 4:
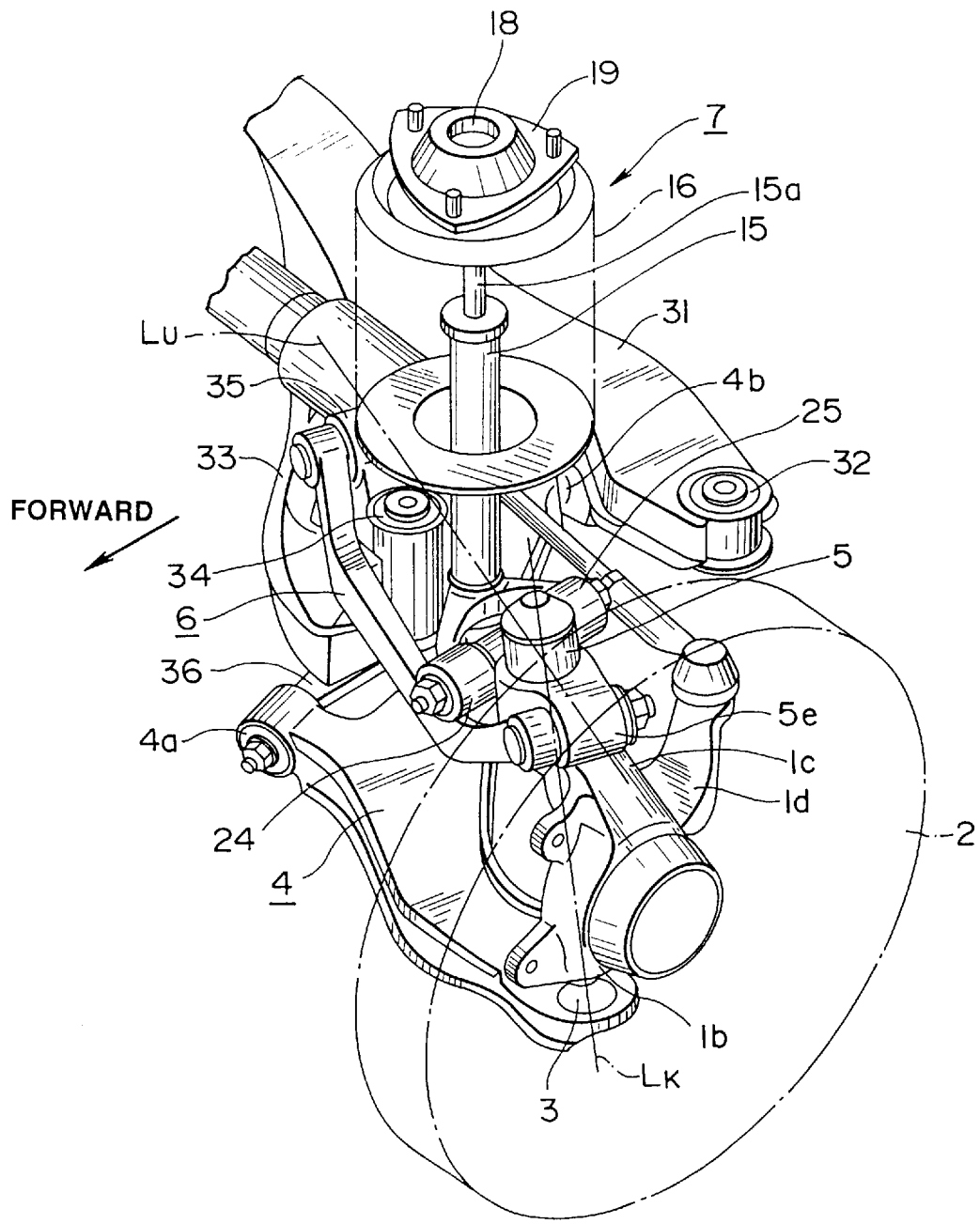
FIG. 4 is a view similar to FIG. 1, showing a second preferred embodiment of the present invention.
Figure 5:
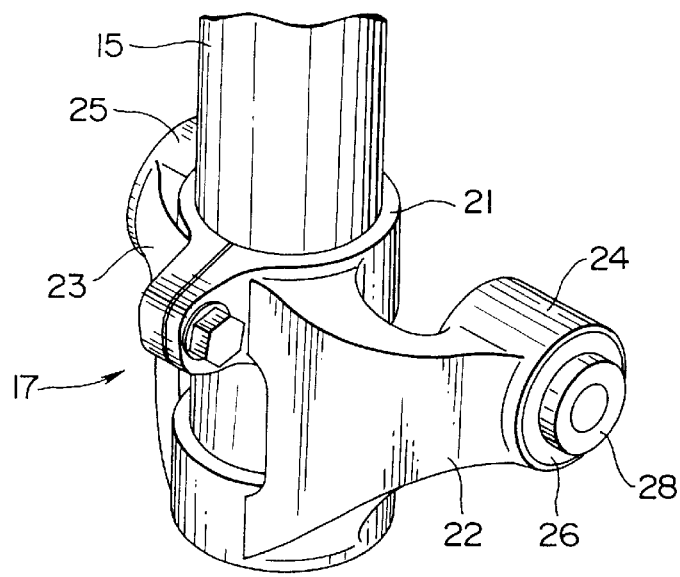
FIG. 5 is a view similar to FIG. 4, showing an example of a mounting bracket of a shock absorber.
Figure 6:
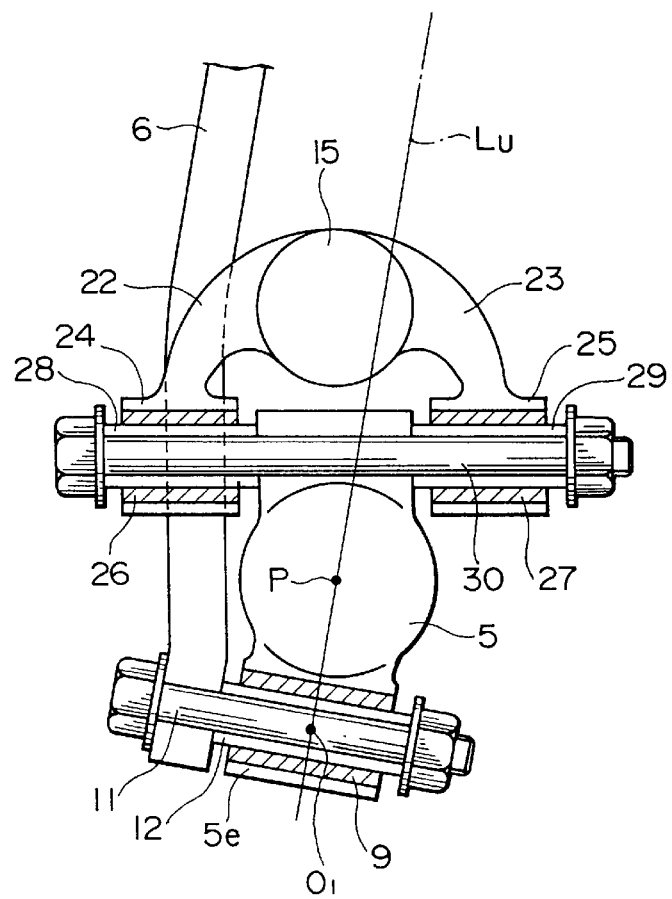
FIG. 6 is a view similar to FIG. 3, showing the rotary connecting member connected to the upper link in the second preferred embodiment.

FIG. 4–6 show a second embodiment of the present invention. The second embodiment has substantially the same construction as that of the first embodiment except a modification to the connection of the rotary connecting member 5 and the shock absorber 15 of the strut 7, and arrangement of a suspension member 31 mounted to the vehicle body for supporting the lower and upper links 4, 6.

Referring to FIGS. 5 and 6, the mounting bracket 17 of the shock absorber 15 of the strut 7 comprises a cylindrical mounting portion 21 mounted to the shock absorber 15 at a lower end thereof, arm portions 22, 23 extending outward as viewed in the cross direction of the motor vehicle from front and rear positions of the cylindrical mounting portion 21, and resilient bushes 26, 27 engaged with cylindrical support portions 24, 25 formed at pointed ends of the arm portions 22, 23.

With the mounting bracket 17 mounted to the shock absorber 15 at the lower end thereof, and with center openings of inner cylinders 28, 29 of the resilient bushes 26, 27 made to correspond to a center opening of the cylindrical support portion 5ƒ of the rotary connecting member 5, a rotation shaft 30 is arranged therethrough so that the mounting bracket 17 is mounted to the rotary connecting member 5 to be rotatable only about substantially the longitudinal axis of the motor vehicle.

On the other hand, the suspension member 31 is arranged to extend in the cross direction of the motor vehicle. A resilient bush 32 arranged at an outer end of the suspension member 31 as viewed in the cross direction is mounted to a vehicle body side member, not shown, whereas a resilient bush 34 arranged at an outer end of a branch portion 33 thereof as viewed in the end view of the front wheel suspension is also mounted to the vehicle body side member, not shown. The branch portion 33 is formed with support portions 35, 36 for supporting the lower and upper links 4, 6.

Due to its construction similar to the first embodiment, the second embodiment produces the same effect as that of the first embodiment.

In the first and second embodiments, the upper link 6 is disposed before the rotary connecting member 5. Alternatively, the upper link 6 may be disposed behind the rotary connecting member 5.

Further, in the first and second embodiments, the vehicle body side member and the upper link 6 are connected to each other through the resilient bush 13, whereas the rotary connecting member 5 and the upper link 6 are connected to each other through the resilient bush 9. Alternatively, ball joints may be used in place of the resilient bushes 13, 19. In that case, a center of a ball of the ball joint forms an immobile center of motion, and a line interconnecting immobile centers of motion of the mounting portions of the upper link at inner and outer ends thereof forms the link axis $L_U$.

Still further, in the first and second embodiments, the lower link 4 is formed in substantially an A-shape. Alternatively, the lower link 4 may comprise two I-shaped lower link parts, each having one end connected at the lower portion of the wheel support member 1 through a ball joint, and another end supported to the vehicle body side member. In that case, considering a king pin axis upon turning of the front wheel 2 as a virtual king pin axis, the king pin can be set in the most suitable position in spite of interference with the other parts such as a brake rotor.

Having described the present invention in connection with the preferred embodiments, it is noted that the present invention is not limited thereto, and various changes and modifications can be made without departing from the spirit of the present invention.

What is claimed is:

1. A wheel suspension for a front wheel of a motor vehicle including a vehicle body, comprising:

a support member rotatable supporting the front wheel, said support member having an upper portion and a lower portion;

a lower link swingably supported by the vehicle body and pivotally supporting said support member at said lower portion thereof;

a connecting member mounted to said upper portion of said support member for rotation about an axis thereof;

a shock absorber operatively connected between the vehicle body and said connecting member;

an upper link swingably supported by the vehicle body and connected to said connecting member; and a tie rod operatively connected to said support member to rotate said support member about said axis of rotation of said connecting member, said upper link being so connected at one single end thereof to said connecting member as to provide an arrangement wherein loading said support member in a lateral direction with respect to a normal forward driving direction of the motor vehicle induces a reaction force along an axis of said upper link without inducing any substantial amount of moment about said axis of rotation of said connecting member, said axis of said upper link crossing said axis of rotation of said connecting member as viewed in an end view of the wheel suspension with respect to the normal forward driving direction, said axis of said upper link and said axis of rotation of said connection member having an intersection point, said upper link being connected to said connecting member at a location disposed outwardly of said intersection point with respect to the vehicle body as viewed in the end view of the wheel suspension.

2. A wheel suspension as claimed in claim 1, wherein a resilient bush is disposed between said upper link and said connecting member.

3. A wheel suspension as claimed in claim 2, wherein said resilient bush has an axis perpendicular to said axis of said upper link.

4. A wheel suspension as claimed in claim 1, wherein said axis of rotation of said connecting member passes through said intersection point.

5. A wheel suspension as claimed in claim 1, wherein said lower link comprises two link parts, each part having one end connected to said support member at said lower portion thereof.

* * * * *